United States Patent
Ruberte Sanchez

(10) Patent No.: US 10,309,318 B2
(45) Date of Patent: Jun. 4, 2019

(54) TURBOMACHINE FLOW DIVERTING DEVICE AND METHOD

(71) Applicant: United Technologies Corporation, Hartford, CT (US)

(72) Inventor: Jose E. Ruberte Sanchez, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 634 days.

(21) Appl. No.: 14/953,476

(22) Filed: Nov. 30, 2015

(65) Prior Publication Data

US 2016/0208715 A1 Jul. 21, 2016

Related U.S. Application Data

(60) Provisional application No. 62/086,396, filed on Dec. 2, 2014, provisional application No. 62/086,409, filed on Dec. 2, 2014.

(51) Int. Cl.
*F02C 9/18* (2006.01)
*F02K 1/38* (2006.01)

(52) U.S. Cl.
CPC ............... *F02C 9/18* (2013.01); *F02K 1/386* (2013.01)

(58) Field of Classification Search
CPC . F02C 9/18; F02K 1/386; F02K 1/383; F01D 1/023; F01D 9/02; F01D 9/06; F01D 17/105; F01D 17/12; F01D 17/14; F01D 17/141
See application file for complete search history.

(56) References Cited

U.S. PATENT DOCUMENTS

| | | | |
|---|---|---|---|
| 3,118,276 A * | 1/1964 | Keenan | F02K 1/386 60/262 |
| 3,386,658 A | 6/1968 | Mehr | |
| 4,010,608 A * | 3/1977 | Simmons | F02K 3/075 60/226.3 |
| 4,175,384 A | 11/1979 | Wagenknecht et al. | |
| 4,372,110 A * | 2/1983 | Fletcher | F02K 1/386 181/213 |
| 5,307,624 A | 5/1994 | Even-Nur et al. | |
| 5,694,767 A | 12/1997 | Vdoviak et al. | |
| 5,806,303 A * | 9/1998 | Johnson | F02K 1/30 60/226.1 |
| 7,878,005 B2 * | 2/2011 | Bradbrook | F01D 19/00 60/226.1 |
| 8,356,483 B2 | 1/2013 | Petty et al. | |
| 2013/0318981 A1 | 12/2013 | Kupratis | |
| 2015/0121841 A1 | 5/2015 | Izquierdo et al. | |

* cited by examiner

*Primary Examiner* — Woody Lee, Jr.
*Assistant Examiner* — Sang K Kim
(74) *Attorney, Agent, or Firm* — Carlson, Gaskey & Olds, P.C.

(57) ABSTRACT

An example turbomachine exhaust flow diverting assembly includes an upstream flow diverter disposed about a rotational axis of a turbomachine, and a downstream flow diverter disposed about the rotational axis and axially misaligned with the upstream flow diverter, the upstream flow diverter and the downstream flow diverter both independently moveable between a first position and a second position, the first position permitting more bypass flow from a bypass flow passage to a core flow passage than the second position.

16 Claims, 2 Drawing Sheets

TURBOMACHINE FLOW DIVERTING DEVICE AND METHOD

CROSS-REFERENCE TO RELATED APPLICATION

This application claims priority to U.S. Provisional Application No. 62/086,396 filed Dec. 2, 2014.

BACKGROUND

This disclosure relates generally to diverting flow at or near an exhaust of a turbomachine.

Gas turbine engines are known and, typically, include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate.

One type of gas turbine engine has multiple bypass streams. In such engine, there is a radially outer bypass flow and a radially inner main bypass flow. Other types of gas turbine engines have other bypass flow arrangements.

SUMMARY

A turbomachine exhaust flow diverting assembly according to an exemplary aspect of the present disclosure includes, among other things, an upstream flow diverter disposed about a rotational axis of a turbomachine, and a downstream flow diverter disposed about the rotational axis and axially misaligned with the upstream flow diverter. The upstream flow diverter and the downstream flow diverter are both independently moveable between a first position and a second position. The first position permits more bypass flow from a main bypass flow passage to a core flow passage than the second position.

In a further non-limiting embodiment of the foregoing assembly, the upstream flow diverter and the downstream flow diverter move axially between the first position and the second position.

In a further non-limiting embodiment of any of the foregoing assemblies, the upstream flow diverter is upstream from the downstream flow diverter relative to a direction of flow through the turbomachine.

In a further non-limiting embodiment of any of the foregoing assemblies, the upstream flow diverter and the downstream flow diverter are disposed along a radially outer boundary of the core flow passage.

In a further non-limiting embodiment of any of the foregoing assemblies, the assembly includes a radially outer bypass flow passage that is radially outside the core flow passage and the main bypass flow passage.

In a further non-limiting embodiment of any of the foregoing assemblies, the first position permits more flow from the radially outer bypass flow passage to a core flow passage than the second position.

In a further non-limiting embodiment of any of the foregoing assemblies, the upstream flow diverter is axially aligned with at least a portion of a turbine engine case of the turbomachine.

In a further non-limiting embodiment of any of the foregoing assemblies, the downstream flow diverter is downstream from the turbine engine case.

In a further non-limiting embodiment of any of the foregoing assemblies, the downstream flow diverter in the first position permits more flow to a variable area mixing plane of the turbomachine than the downstream flow diverter in the second position.

In a further non-limiting embodiment of any of the foregoing assemblies, the downstream flow diverter in the second position permits more flow to a nozzle of the turbomachine than the downstream flow diverter in the first position.

In a further non-limiting embodiment of any of the foregoing assemblies, the upstream flow diverter comprises a plurality of individual doors distributed annularly about the rotational axis. The upstream flow diverter could instead be a full annular ring extending circumferentially continuously about the axis.

A turbomachine assembly according to another exemplary aspect of the present disclosure includes, among other things, a core flow passage extending axially from a fan section to an exhaust, a radially inner bypass flow passage that is radially outside the core flow passage, and a radially outer bypass flow passage that is radially outside the radially inner bypass flow passage. An upstream flow diverter is disposed about a rotational axis of a turbomachine. A downstream flow diverter is disposed about the rotational axis and axially misaligned with the upstream flow diverter. The upstream flow diverter and the downstream flow diverter are both independently moveable between a first position and a second position. The first position permits more bypass flow to a core flow passage than the second position.

In a further non-limiting embodiment of the foregoing assembly, the upstream flow diverter and the downstream flow diverter move axially between the first position and the second position.

In a further non-limiting embodiment of any of the foregoing assemblies, the upstream flow diverter and the downstream flow diverter are annular.

In a further non-limiting embodiment of any of the foregoing assemblies, at least a portion of the upstream flow diverter is axially aligned with a turbine exhaust case, and the downstream flow diverter is downstream from the turbine exhaust case relative to a general direction of flow through the turbomachine.

In a further non-limiting embodiment of any of the foregoing assemblies, the assembly includes a radially outer bypass flow passage that is radially outside the core flow passage and the radially inner bypass flow passage.

In a further non-limiting embodiment of any of the foregoing assemblies, the first position permits more flow from the radially outer bypass flow passage to a core flow passage than the second position.

A method of controlling flow through an exhaust of a turbomachine includes, among other things, at a first position, selectively permitting bypass flow to move to a core flow passage, and, at a second position, selectively permitting bypass flow to move to a core flow passage. The first position is axially spaced from the second position.

In a further non-limiting embodiment of the foregoing method, the first position is at least partially axially aligned with a turbine exhaust case.

In a further non-limiting embodiment of any of the foregoing methods, the second position is at least partially axially aligned with a variable area mixing plane that is downstream from the turbine exhaust case relative to a general direction of flow through the turbomachine.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
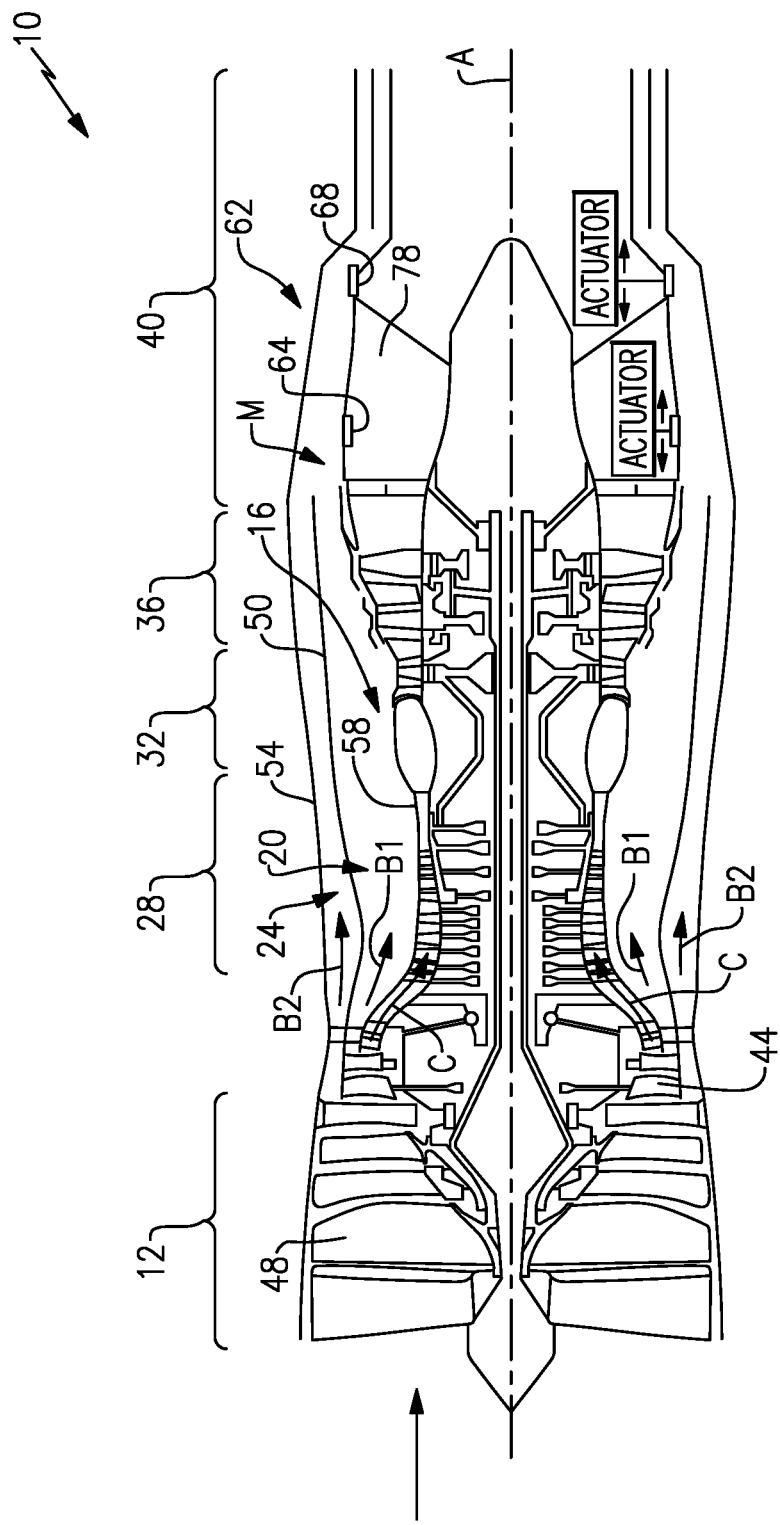
FIG. 1 is a cross-sectional view of a multiple bypass stream gas turbine engine having an upstream flow diverter and a downstream flow diverter.

FIG. 1 shows an exemplary engine 10 in a schematic manner. A fan section 12 delivers air into a core engine 16, a radially inner bypass passage 20, and a radially outer bypass passage 24.

A core engine flow C of air is delivered to the core engine 16 from the fan section 12 and moves along a core flow passage 26 of the core engine 16 extending through a compressor section 28, a combustor section 32, a turbine section 36, and then an exhaust section 40. Compressed air from the compressor section 28 is mixed with fuel and ignited in the combustor section 32. The products of combustion drive turbine rotors in the turbine section 36 to rotatably drive compressor rotors in the compressor section 28, and fan rotors 44 and 48 about an axis A.

The fan rotor 44 provides air to the main bypass flow B1 and the core engine flow C. The main bypass flow B1 flows through the radially inner bypass passage 20 inwardly of a main bypass outer housing 50, and outwardly of a core engine outer housing 58.

The fan rotor 48 provides air to the main bypass flow B1, the core engine flow C, and a third stream bypass flow B2. The third stream bypass flow B2 flows through a radially outer bypass passage 24 that is defined inwardly of a third stream bypass outer housing 54 and radially outwardly of the main bypass outer housing 50.

Moving axially along the engine 10 in a general direction of flow through the engine 10, the main bypass outer housing 50 terminates near the end of the turbine section 36. Terminating the main bypass outer housing 50 in this area permits bypass flows B1 and B2 to mix in an area M.

Figure 2:
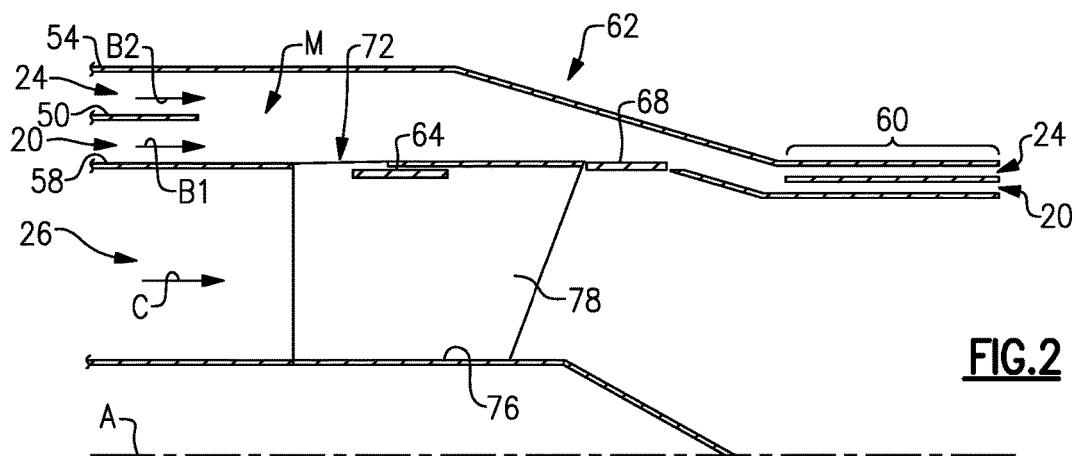
FIG. 2 is a close-up view of a portion of an exhaust of the engine of FIG. 1 and showing the upstream flow diverter and the downstream flow diverter.

Referring to FIG. 2 with continuing reference to FIG. 1, the main bypass outer housing 50 begins again in a nozzle portion 60 of the exhaust section 40. Thus, flow through the nozzle portion 60 is again segregated into a main bypass flow B1 and a third stream bypass flow B2.

The exhaust section 40 of the example engine 10 includes a flow modulating assembly 62 to manipulate flow through the exhaust section 40 of the engine 10. The flow modulating assembly 62 includes an upstream flow diverter 64 and a downstream flow diverter 68. The diverters 64 and 68 manipulate flow within the exhaust section 40 by controlling movement of bypass flows B1 and B2 to the core flow C.

The upstream flow diverter 64 is moveable between a first position and a second position. The upstream flow diverter 64 permits more flow from the bypass flow passages 20 and 24 to move to the core flow passage 26 when in the first position than when in the second position. In some examples, the upstream flow diverter 64 seals an opening 72 within the core engine outer housing 58 when the upstream flow diverter 64 is in the second position.

The first and second positions for the upstream flow diverter 64 are not singular predefined positions. The first position can, for example, refer to a plurality of possible positions that, relative to other positions, permit more of the flow from the bypass flow passages 20 and 24 to move to the core flow passage 26.

The upstream flow diverter 64 is radially aligned with the boundary of the core engine outer housing 58. The upstream flow diverter 64 includes at least a portion that is axially aligned with a turbine exhaust case 76 of the exhaust section 40.

The upstream flow diverter 64 can include several individual diverters distributed about the axis A and positioned circumferentially between vanes 78 of the turbine exhaust case 76. The upstream flow diverters 64 can be a sliding seal or door. In another example, the upstream flow diverter 64 is a full annular ring extending continuously about the axis and can be radially misaligned with the turbine exhaust case 76.

The downstream flow diverter 68 is moveable to a first position and a second position. When the downstream flow diverter 68 is in the first position, the downstream flow diverter 68 permits more flow from the bypass flow passages 20 and 24 to move to the core flow passage 26 than when the downstream flow diverter 68 is in the second position. Bypass flow may move through an opening 80 when entering the core flow passage 26.

When in the second position, the downstream flow diverter 68 may effectively seal the opening 80 preventing movement of bypass flow to the core flow passage 26. Blocking movement of flow through the opening 80 directs more flow through the nozzle portion 60 of the exhaust section 40.

The first and second positions for the downstream flow diverter 68 are not singular predefined positions in this example. The first position can, for example, refer to a plurality of possible positions that, relative to other positions, permit more of the flow from the bypass flow passages 20 and 24 to move to the core flow passage 26.

When the downstream flow diverter 68 is in the first position, the downstream flow diverter 68 may block bypass flow from entering the nozzle portion 60.

The example downstream flow diverter 68 is an annular ring formed of multiple individual flaps that overlap each other circumferentially in a shiplapped manner. The example downstream flow diverter 68 extends continuously about the axis.

The upstream flow diverter 64 and the downstream flow diverter 68 move axially between the first positions and the second positions. An actuator, such as a pneumatic hydraulic may be used to move the diverters 64 and 68 axially.

When the upstream flow diverter 64 is in the position of FIG. 2, the turbine exhaust case 76 is cooled by bypass flow that has moved from the bypass flow passages 20 and 24 to the core flow passage 26. Moving the upstream flow diverter 64 aftward to reveal more of the opening 72 can increase bypass flow through the opening 72 to further enhance cooling.

When the downstream flow diverter 68 is in the position of FIG. 2, bypass flow is blocked from moving through the opening 80 to the core flow passage 26. Instead, the downstream flow diverter 68 directs the bypass flow to the nozzle portion 60. Directing bypass flow through the nozzle portion 60 enhances cooling of the nozzle portion 60, which may enhance material durability of components within or near the nozzle portion 60.

Figure 3:
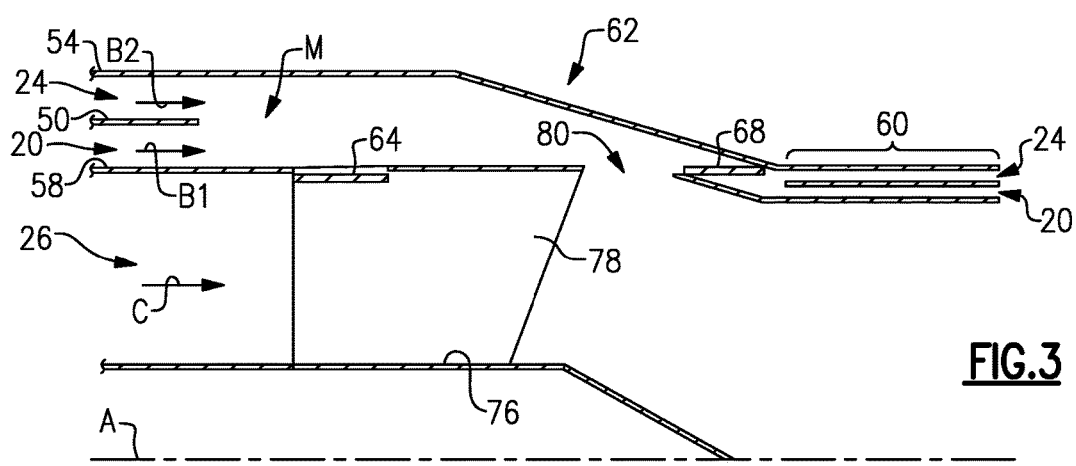
FIG. 3 is a close-up view of a portion of an exhaust of the engine of FIG. 1 showing the upstream flow diverter and the downstream flow diverter moved from the positions of FIG. 2.

When the upstream flow diverter 64 is in the position of FIG. 3, bypass flow is blocked from moving through the opening 72 to the core flow passage 26. Instead, the bypass flow moves downstream past the turbine exhaust case 76.

When the downstream flow diverter 68 is in the position of FIG. 3, flow from the bypass flow passages 20 and 24 can move through the opening 80 and is blocked from entering the nozzle portion 60. Directing bypass flow through the opening 80 to the core flow passage 26 can provide relatively efficient thrust.

The positions of the upstream flow diverter 64 and the downstream flow diverter 68 in FIG. 3 may be most appropriate when the engine is operating at an efficient cruising stage.

Figure 4:
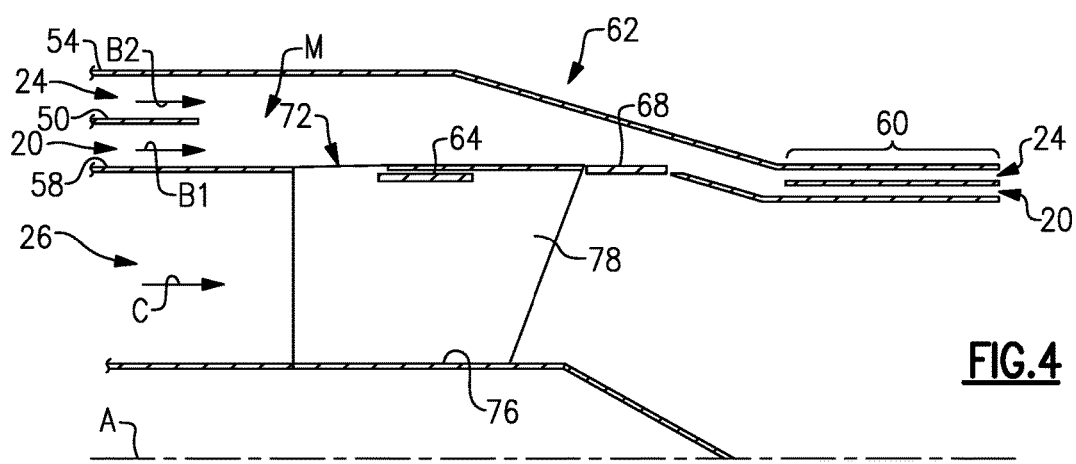
FIG. 4 is a close-up view of a portion of an exhaust of the engine of FIG. 1 showing the upstream flow diverter and the downstream flow diverter moved from the positions of FIG. 3.

When the upstream flow diverter 64 is in the position of FIG. 4, bypass flow is free to move through the opening 72, which can cool the turbine exhaust case 76.

More of the opening 72 is revealed when the upstream flow diverter 64 is in the position of FIG. 4 than when the upstream flow diverter 64 is in the position of FIG. 2. This repositioning of the upstream flow diverter 64 results in more bypass flow directed toward the turbine exhaust case 76 when the upstream flow diverter 64 is in the position of FIG. 4, than when the upstream flow diverter 64 is in the position of FIG. 2.

Less bypass flow moves to the nozzle portion 60 when the upstream flow diverter 64 is in the position of FIG. 4 than when in the position of FIG. 2. Thus, positioning the upstream flow diverter 64 in the position of FIG. 2, rather than the position of FIG. 4, can result in more relative cooling of the components providing the nozzle portion 60.

The upstream flow diverter 64 and the downstream flow diverter 68 are independently moveable between the respective first positions and second positions. The upstream flow diverter 64 is axially spaced from the downstream flow diverter 68. Each of the flow diverters 64 and 68 can cover or uncover separate openings within the engine 10.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine exhaust flow diverting assembly, comprising:
   an upstream flow diverter disposed about a rotational axis of a turbomachine, radially outward of a turbine exhaust case, and between a core flow passage and a main bypass passage; and
   a downstream flow diverter disposed downstream of the upstream flow diverter about the rotational axis and axially misaligned with the upstream flow diverter, radially outward of the turbine exhaust case, and between the core flow passage and the main bypass passage, the upstream flow diverter being moveable between a first upstream flow diverter position and a second upstream flow diverter position, the downstream flow diverter being moveable between a first downstream flow diverter position and a second downstream flow diverter position, the upstream flow diverter and the downstream flow diverter being independently moveable, and each of the first upstream flow diverter position and the first downstream flow diverter position permitting more bypass flow from a main bypass flow passage to the core flow passage than the corresponding one of the second upstream flow diverter position and the second downstream flow diverter position.

2. The assembly of claim 1, wherein the upstream flow diverter and the downstream flow diverter move axially between the corresponding one of the first upstream flow diverter position and the first downstream flow diverter position and the corresponding one of the second upstream flow diverter position and the second downstream flow diverter position.

3. The assembly of claim 1, wherein the upstream flow diverter is upstream from the downstream flow diverter relative to a direction of flow through the turbomachine.

4. The assembly of claim 1, wherein the upstream flow diverter and the downstream flow diverter are disposed along a radially outer boundary of the core flow passage.

5. The assembly of claim 1, further comprising a radially outer bypass flow passage that is radially outside the core flow passage and the main bypass flow passage.

6. The assembly of claim 5, wherein each of the first upstream flow diverter position and the first downstream flow diverter position permits more flow from the radially outer bypass flow passage to the core flow passage than the corresponding one of the second upstream flow diverter position and the second downstream flow diverter position.

7. The assembly of claim 1, wherein the upstream flow diverter is axially aligned with at least a portion of a turbine engine case of the turbomachine.

8. The assembly of claim 7, wherein the downstream flow diverter is downstream from the turbine engine case.

9. The assembly of claim 1, wherein the downstream flow diverter in the first downstream flow diverter position permits more flow to a variable area mixing plane of the turbomachine than the downstream flow diverter in the second downstream flow diverter position.

10. The assembly of claim 9, wherein the downstream flow diverter in the second downstream flow diverter position permits more flow to a nozzle of the turbomachine than the downstream flow diverter in the first downstream flow diverter position.

11. The assembly of claim 1, wherein the upstream flow diverter comprises a plurality of individual doors distributed annularly about the rotational axis.

12. A turbomachine assembly, comprising:
    a core flow passage extending axially from a fan section to an exhaust;
    a radially inner bypass flow passage that is radially outside the core flow passage;
    a radially outer bypass flow passage that is radially outside the radially inner bypass flow passage;
    an upstream flow diverter disposed about a rotational axis of a turbomachine and radially outward of an exhaust case; and
    a downstream flow diverter disposed downstream of the upstream flow diverter about the rotational axis and axially misaligned with the upstream flow diverter, radially outward of the turbine exhaust case, and between the core flow passage and the radially inner bypass flow passage, the upstream flow diverter being moveable between a first upstream flow diverter position and a second upstream flow diverter position, the upstream flow diverter and the downstream flow diverter being independently moveable, and each of the first upstream flow diverter position and the first downstream flow diverter position permitting more bypass flow from the radially inner bypass flow passage to the core flow passage than the corresponding one of the second upstream flow diverter position and the second downstream flow diverter position.

13. The assembly of claim 12, wherein the upstream flow diverter and the downstream flow diverter move axially between the corresponding one of the first upstream flow diverter position and the first downstream flow diverter position and the corresponding one of the second upstream flow diverter position and the second downstream flow diverter position.

14. The assembly of claim 12, wherein the upstream flow diverter and the downstream flow diverter are annular.

15. The assembly of claim 12, wherein at least a portion of the upstream flow diverter is axially aligned with a turbine exhaust case, and the downstream flow diverter is downstream from the turbine exhaust case relative to a general direction of flow through the turbomachine.

16. The assembly of claim 12, wherein the first position permits more flow from the radially outer bypass flow passage to a core flow passage than the second position.

\* \* \* \* \*

UNITED STATES PATENT AND TRADEMARK OFFICE
CERTIFICATE OF CORRECTION

PATENT NO. : 10,309,318 B2
APPLICATION NO. : 14/953476
DATED : June 4, 2019
INVENTOR(S) : Jose E. Ruberte Sanchez It is certified that error appears in the above-identified patent and that said Letters Patent is hereby corrected as shown below:

In the Claims

In Claim 16, Column 7, Line 28; replace "first position" with --first upstream flow diverter position--

In Claim 16, Column 7, Line 30; replace "second position" with --second upstream flow diverter position--

Signed and Sealed this
Twenty-first Day of January, 2020

Andrei Iancu
*Director of the United States Patent and Trademark Office*